Figure 1:
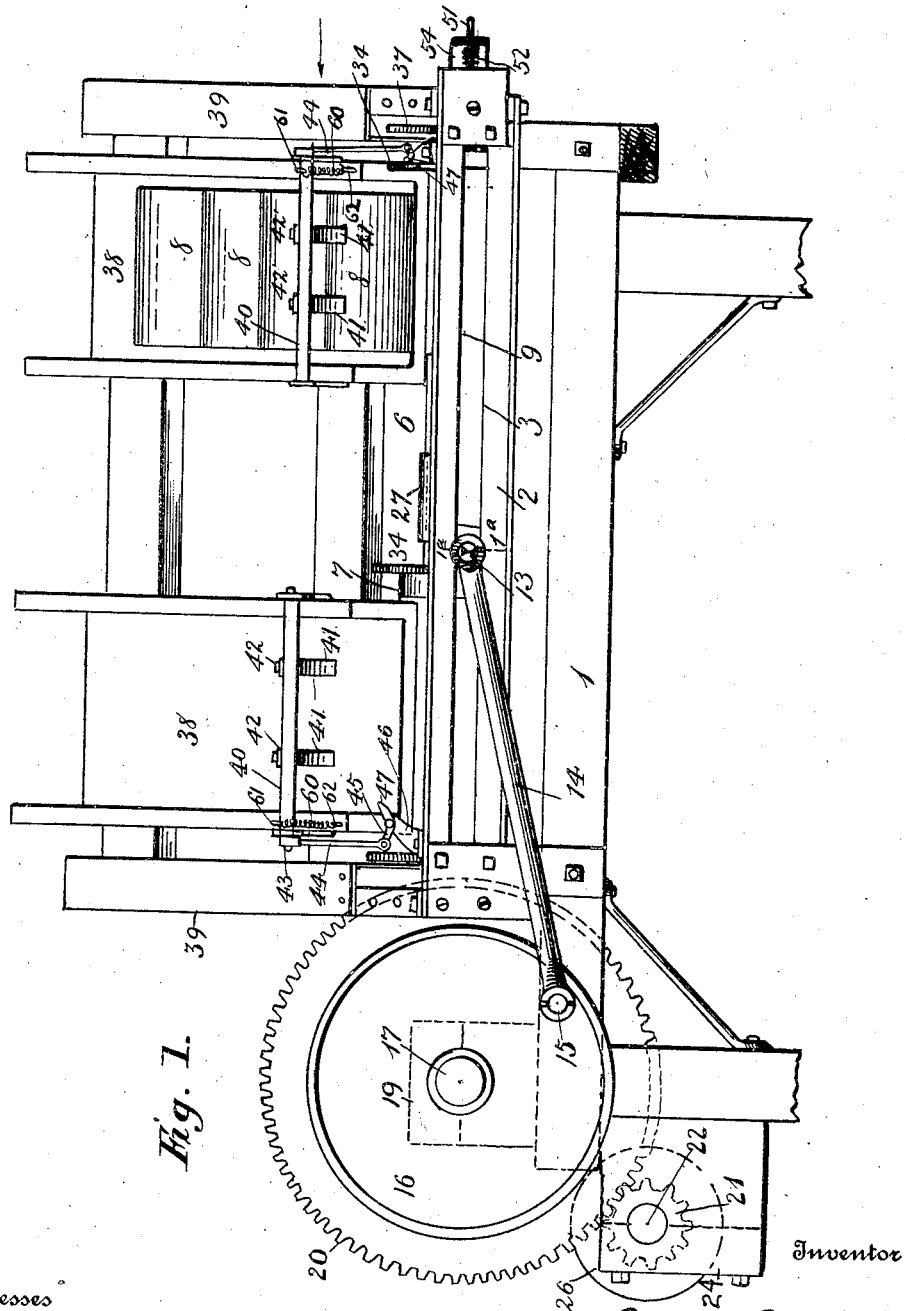

J. T. BOND.
MACHINE FOR APPLYING COVERS TO RECEPTACLES.
APPLICATION FILED JAN. 7, 1910.

1,050,606.

Patented Jan. 14, 1913.

5 SHEETS—SHEET 1.

Witnesses

Inventor
J. T. Bond.
By
Attorney

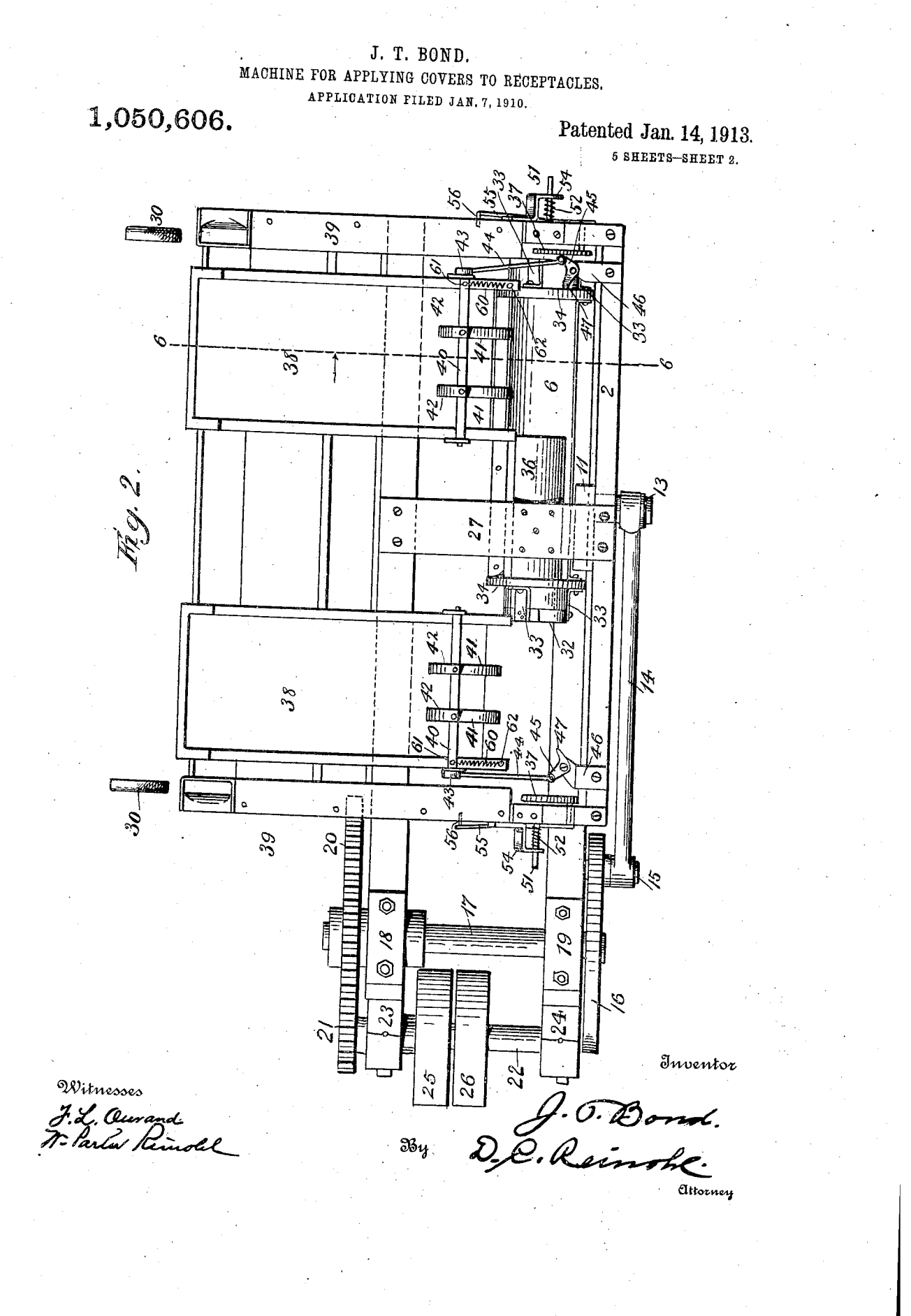

J. T. BOND.
MACHINE FOR APPLYING COVERS TO RECEPTACLES.
APPLICATION FILED JAN. 7, 1910.

1,050,606.

Patented Jan. 14, 1913.
5 SHEETS—SHEET 2.

J. T. BOND.
MACHINE FOR APPLYING COVERS TO RECEPTACLES.
APPLICATION FILED JAN. 7, 1910.
1,050,606.
Patented Jan. 14, 1913.
5 SHEETS—SHEET 3.
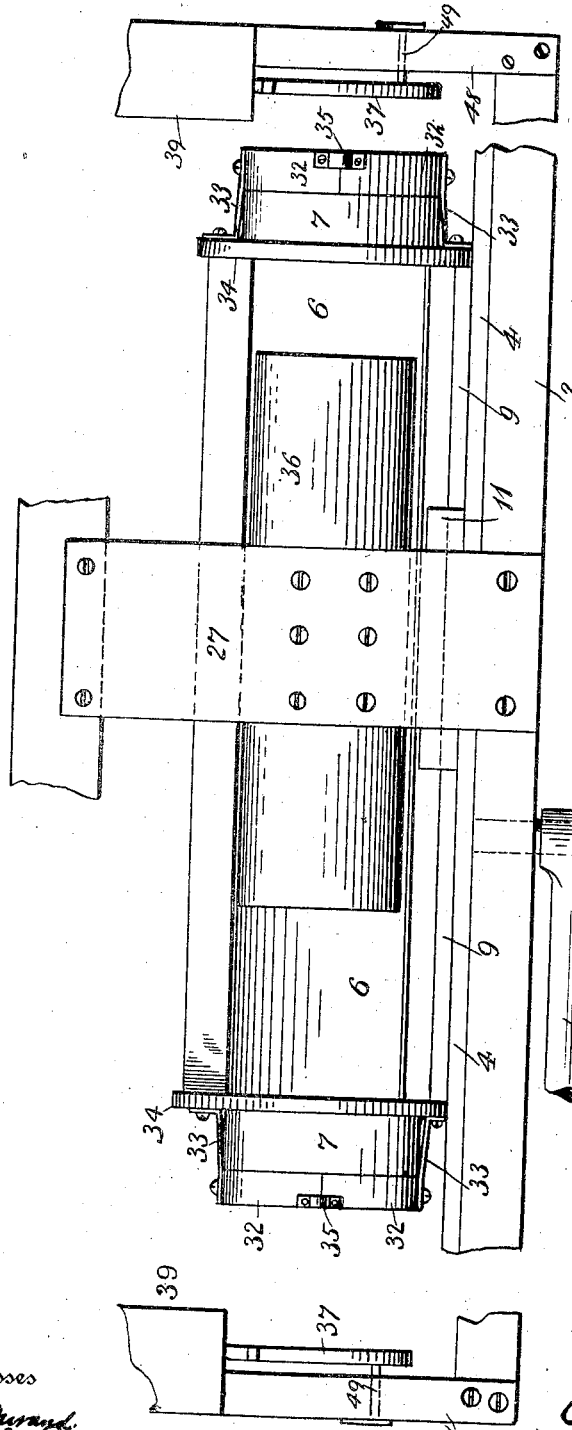
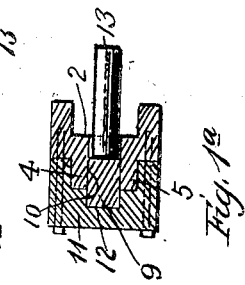
Witnesses
Inventor
J. T. Bond.
By D. C. Reinohl.
Attorney J. T. BOND.
MACHINE FOR APPLYING COVERS TO RECEPTACLES.
APPLICATION FILED JAN. 7, 1910.
1,050,606.
Patented Jan. 14, 1913.
5 SHEETS—SHEET 4.
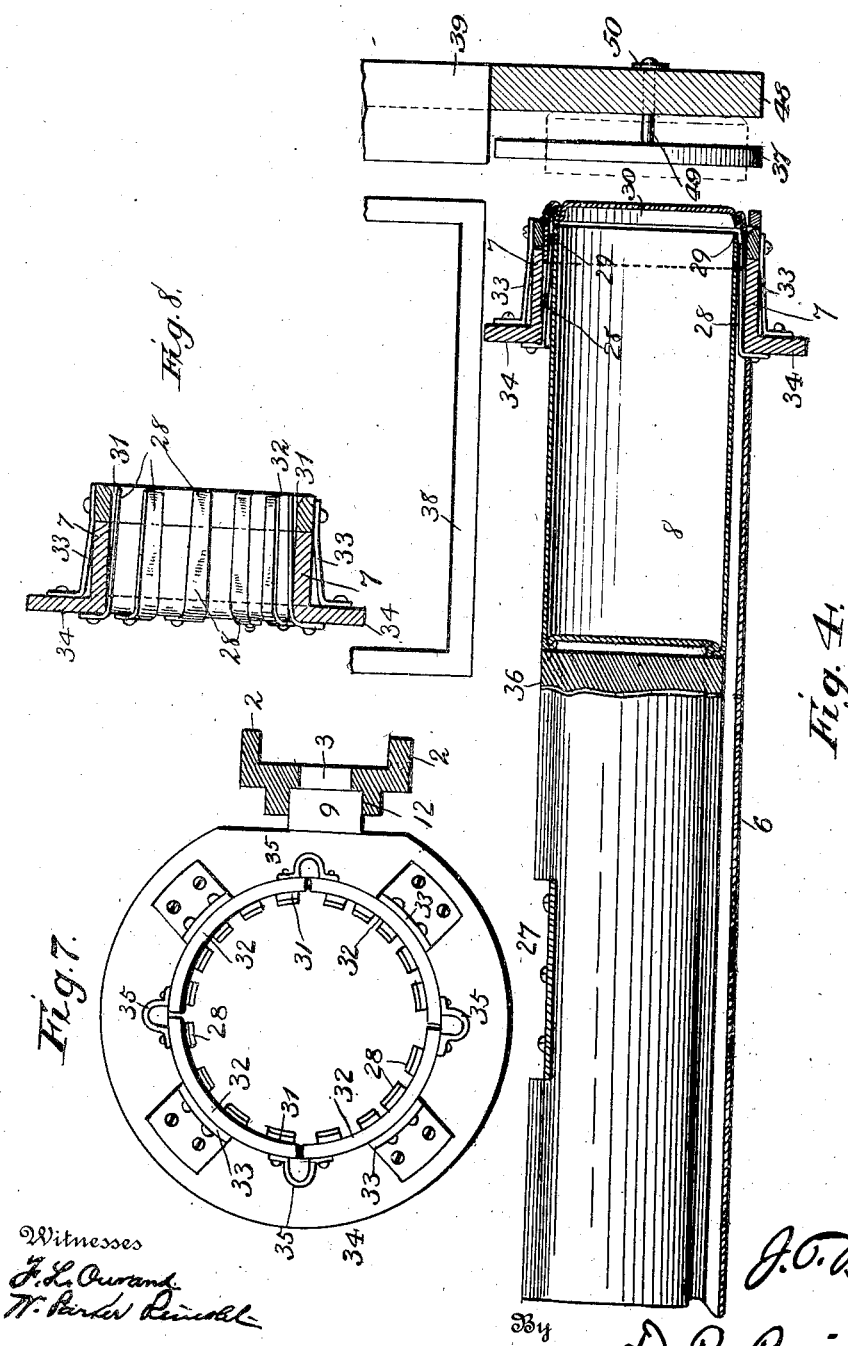

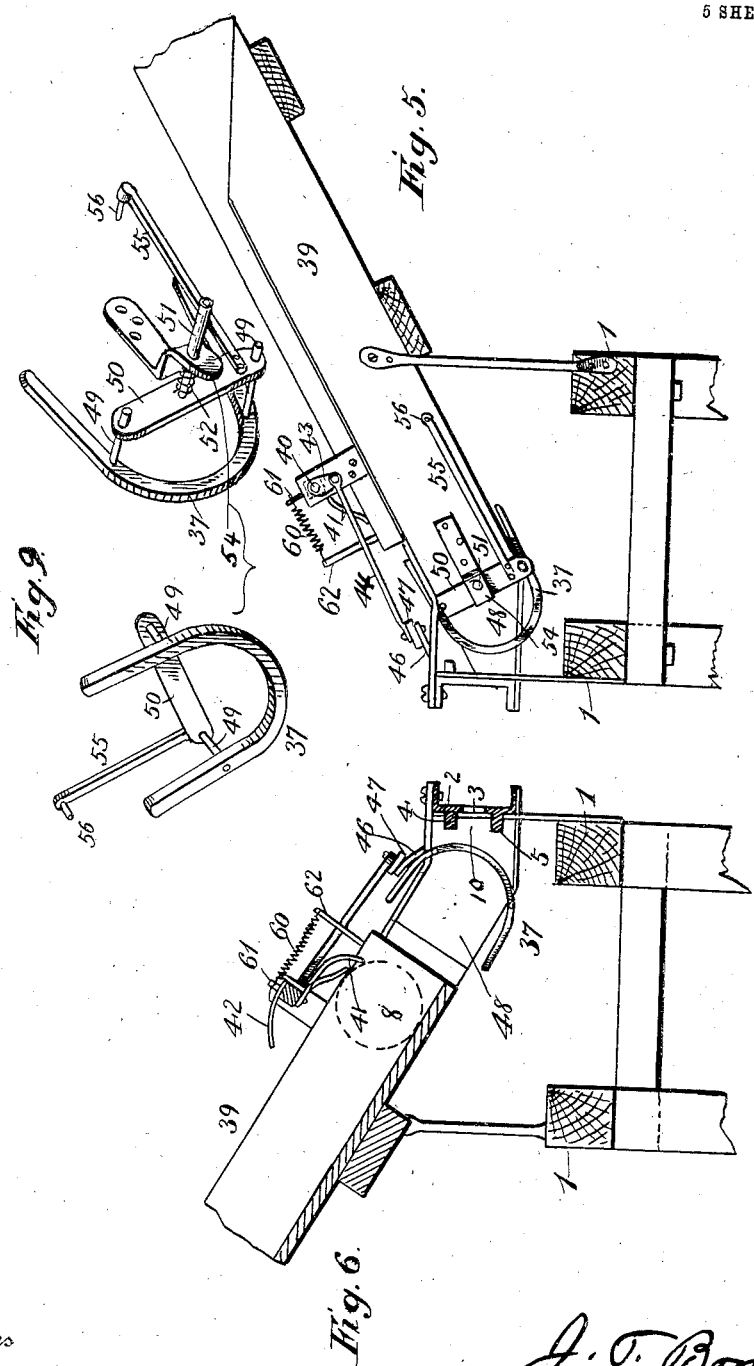

UNITED STATES PATENT OFFICE.

JOSEPH T. BOND, OF SPENCERVILLE, MARYLAND, ASSIGNOR TO PURITY PAPER BOTTLE CORPORATION, OF WASHINGTON, DISTRICT OF COLUMBIA.

MACHINE FOR APPLYING COVERS TO RECEPTACLES.

1,050,606.     Specification of Letters Patent.     Patented Jan. 14, 1913.

Application filed January 7, 1910. Serial No. 536,946.

*To all whom it may concern:*

Be it known that I, JOSEPH T. BOND, a citizen of the United States, residing at Spencerville, in the county of Montgomery and State of Maryland, have invented certain new and useful Improvements in Machines for Applying Covers to Receptacles; and I do hereby declare the following to be a full, clear, and exact description of the invention, such as will enable others skilled in the art to which it appertains to make and use the same.

My invention relates to machines for applying covers to receptacles, has especial reference to the manufacture of paper receptacles, in which the covers are usually applied by hand which adds considerably to the cost, and has for its object a machine capable of doing the work effectively, rapidly and at a greatly reduced cost to the manufacturer.

The invention consists in certain improvements in construction by which a cover is applied to a receptacle at each stroke of the machine or two covers are applied in each cycle of operation, one in the forward and the other in the return stroke of the machine.

The invention will be fully disclosed in the following specification and claims.

In the accompanying drawings, which form part of this specification:—Figure 1 represents a front or side elevation of a machine embodying my invention. Fig. 1ª is a vertical transverse section on line 1ª Fig. 1, showing the guide and bearings for the receptacle-support. Fig. 2 is a top plan view of the machine. Fig. 3 is a like view on an enlarged scale, the feed troughs and the operating mechanism being omitted. Fig. 4 is a like view of one end of the receptacle-support, showing a receptacle in the support with a cover partly applied thereto. Fig. 5 is an end elevation looking in the direction of the arrow on Fig. 1. Fig. 6 is a vertical transverse section of the outer feed trough on line 6, 6, looking in the direction of the arrow on Fig. 2, the support being at the opposite end of its stroke. Fig. 7 is an enlarged end view of the support detached, showing the resilient members for guiding and retaining the cover on the receptacle. Fig. 8 is a vertical longitudinal section through the part shown in Fig. 7, on a reduced scale, and Fig. 9 is a detail perspective showing the cover support.

Reference being had to the drawings and the designating characters thereon, the numeral 1 indicates a suitable frame on which the machine is supported.

2 indicates a longitudinally extending bar provided with a longitudinal slot 3, and on the inner side of said bar and on the upper and lower sides of said slot are longitudinal projections 4, 5.

6 indicates a reciprocatory receptacle-support having annular or cylindrical members 7, 7, at each end, and the intermediate portion of the support is open on its upper side to receive receptacles 8 as they are conducted to the support. On one side of the support is a longitudinally extending bar 9, which travels in the way 10 between the projections 4 and 5; and the bar 9 is supported in position on the inside of the bar 2 by a metallic guide 11 secured to bar 2 by suitable bolts, and is provided with a rebate or seat 12 in which the bar 9 travels.

13 is a wrist-pin secured to the bar 9, which extends through the slot 3 in the bar 2 and is engaged by one end of a pitman rod 14, the opposite end of which is attached to a wrist-pin 15 on a crank-disk 16, as shown in Figs. 1 and 2 of the drawings. The disk 16 is secured to a shaft 17 which crosses the frame 1 transversely at one end thereof and is supported in suitable bearings 18 19, and on said shaft 17 is a master-gear-wheel 20 engaged by a pinion 21 on a shaft 22 supported in bearings 23 and 24 and provided with pulleys 25 and 26, to be driven by belts from a suitable source of power, such as a main shaft, or an individual electric motor, not shown.

The annular members 7, 7, of the support 6 are provided with a plurality of resilient members or fingers 28 which extend longitudinally therein, are preferably tapered as shown in Fig. 8 and are projected between the inside of flange 29 of the cover 30 and the outside of the body of the receptacle 8 to guide the cover over the end of the receptacle and prevent breaking the end of the body of the receptacle or the flange of the cover and allow the escape of air imprisoned in the receptacle. The fingers 28 are secured at their heels or inner ends to the flanges 34 of the annular members 7, 7, in any preferred manner, leaving a space 31 between them and the wall of the members 7, 7, to receive the flange 29 of the cover and to engage the outside of the body of the receptacle 8.

On the outer end of each member 7, is a radially expansible and contractible member composed of segments 32 secured to resilient brackets or lugs 33, which are attached to the flange 34 on the annular members 7, 7, and the adjacent ends of said segments are secured together by expansible and contractible spring loop-pieces 35, so that said segments can expand radially when the flange 29 of the cover 30 is forced over the fingers 28, and the resiliency of the lugs 33 and the loop-pieces 35 operating on the segments 32 hold said segments in engagement with the flange of the cover, draw the cover over the end of the receptacle 8 and retain the cover in position on the receptacle while the annular members 7, 7, are being drawn back over the receptacle and the fingers 28 withdrawn from between the flange of the cover and the body of the receptacle.

36 indicates a cylindrical member immovably supported in the support by a transverse bar 27 connected to the frame of the machine, or in any preferred manner. The member 36 is approximately the diameter of the receptacle 8 and serves as an anvil while the cover 30 is being applied, and as an ejector afterwards to expel the receptacle from the support as the support is drawn back under the receptacle with its cover attached.

37 indicates a cover-support, approximately U-shaped, open at one end, and located at each end of the machine in alinement with the receptacle-support 6 and adjacent to each end of said support when it reaches the end of its forward and return strokes respectively.

38, 38, are feed-troughs or chutes for the receptacles 8, and 39, 39, are feed troughs or chutes for the covers 30, arranged adjacent to the former chutes and in planes parallel therewith. The chutes 38, 38 are provided with receptacle retainers or stops comprising a shaft 40 crossing the chutes and bars or projections 41, 41, which engage the receptacle at the lower end of the chute.

43 is a crank on the end of the shaft 40 engaged by a link or rod 44 whose opposite end is connected to one arm of a bell-crank-lever 45, pivotally secured on a bracket 46, the opposite arm 47 of said lever being in the path of the flange 34 on each member 7, 7, at the ends of the support 6, and are struck thereby as the support approaches each end of its working stroke to release a receptacle 8 and allow it to gravitate into the carrier preparatory to the support completing its stroke and taking a cover 30 from the cover-support 37 and drawing it back over the end of the receptacle. While the lower bars 41 are raised in the act of releasing a receptacle, the upper bars 42 are moved downward and engage the next receptacle to prevent it moving down the chute until the receptacle in front of it has fallen into the receptacle support.

The shaft 40 and the bars 41, 42, are returned to their normal position and held there by spring 60, secured at one end to a pin 61 on the shaft 40 and at the opposite end to a post 62 or the like on one of the side walls of the chute 38. The cover-support 37, is supported on an extension 48 of the chute 39, and normally sets out away from the extension to balance the cover 30 so that it will maintain a vertical position in the support for entrance into the outer end of the section 7 of the carrier when it is forced into the expanded end thereof and seized thereby.

49, 49, are pins on the support 37 which are connected to a bar 50, on which is a pin 51 surrounded by a spring 52, one end of which rests on said bar 50 and the opposite end bears against a fixed lug 54. On said bar 50 is secured a rod 55 having a pin 56 at its outer end which projects or extends through the side of the chute 39 and forms a stop for arresting the covers as they gravitate down the chute. The pin 56 is carried outward with the support 37 and automatically releases a cover as the support is struck by the end of the annular member 7, of the support 6 at each end of the stroke of the machine, and said parts are returned to their normal position by the spring 52.

Changes may be made in details of the construction without departing from the spirit of my invention.

Having thus fully described my invention, what I claim is—

1. In a machine of the class described, a reciprocatory receptacle-support, concentrically arranged resilient members within the support extending longitudinally thereof and adapted to extend between the body and the flange of the cover of the receptacle and surround the body to guide the cover on one end of the receptacle, means for applying the cover to the receptacle, and means for expelling the receptacle from the support.

2. In a machine of the class described, a reciprocatory receptacle-support, concentri-members at each end of the support adapted to extend between the body and the flange of the cover of the receptacles to guide the cover on one end of each receptacle, means at each end of the support for applying the covers to the receptacles, and means for expelling receptacles from each end of the support alternately.

3. In a machine of the class described, a reciprocatory receptacle-support, concentrically arranged means within the support adapted to extend between the body and the flange of the cover of a receptacle and surround the body for guiding the cover on one end of the receptacle, means for applying and retaining the cover on the receptacle, and means for expelling the receptacle from the support.

4. In a machine of the class described, a reciprocatory receptacle-support, means within the support at each end adapted to extend between the body and the flange of the cover of a receptacle for guiding the cover on one end of the receptacles, means at each end of the support for applying and retaining the cover to the receptacles, and means for expelling the receptacle from the support.

5. In a machine of the class described, a reciprocatory receptacle-support, resilient members within the support adapted to extend between the body and the flange of the cover of a receptacle for guiding the cover on one end of the receptacle, a resilient member for applying and retaining the cover on the receptacle, and means for expelling the receptacle from the support.

6. In a machine of the class described, a reciprocatory receptacle-support, resilient members within the support adapted to extend between the body and the flange of the cover of a receptacle for guiding the cover on the receptacle, a resilient member for applying and retaining the cover on the receptacle, means for supplying receptacles to the support, means for supplying covers adjacent to the end of the receptacle support, and means for expelling receptacles from said support.

7. In a machine of the class described, a support for receptacles having longitudinally extending resilient members at the end thereof adapted to extend between the body and the flange of the cover of a receptacle for guiding the cover on the receptacle, an expansible and contractible member for applying and retaining the cover on the receptacle, and means for expelling the receptacle from said support.

8. In a machine of the class described, a support for receptacles open at one side and one end to receive and discharge receptacles therefrom, an annular member at the end thereof provided with longitudinally extending resilient fingers arranged around the interior thereof, and a radially expansible and contractible member beyond said fingers, means for engaging the closed end of the receptacle while the cover is being applied and for expelling the receptacles from said supports.

9. In a machine of the class described, a reciprocatory receptacle support having an annular member at the end thereof provided with longitudinally extending resilient members adapted to extend between the body and the flange of the cover of a receptacle, and an expansible and contractible member to engage the exterior of said flange, means for engaging the closed end of the receptacle while the cover is being applied, and for expelling the receptacle from the support.

10. In a machine of the class described, a reciprocatory receptacle support having an annular member at each end thereof, provided with longitudinally extending resilient members adapted to extend between the body of the receptacle and the flange of the cover, and an expansible and contractible member to engage the exterior of said flange, means for engaging the closed end of the receptacle while the cover is being applied and for expelling the receptacle from the support.

11. In a machine of the class described, a reciprocatory receptacle-support provided with means for applying a cover to one end of a receptacle, a laterally movable support for a cover adjacent to, in alinement with and operated by said receptacle-support, and means for engaging the closed end of the receptacle while the cover is being applied.

12. In a machine of the class described, a longitudinally reciprocatory receptacle-support provided with means at each end thereof engaging the body and the flange of the cover of a receptacle for applying a cover to the receptacle, means for supporting a cover at each end of the machine and in the longitudinal plane of said receptacle support, means for conducting receptacles to said receptacle-support at each end of its reciprocatory movement, means for conducting covers to said cover-support, and means operated by said receptacle-support for automatically supplying receptacles and covers.

13. In a machine of the class described, a longitudinally reciprocatory receptacle-support, means for conducting receptacles to said support, a chute for supplying covers, a support for covers attached to said chute and in alinement with said receptacle-support, means for retaining receptacles in their conductor, means for retaining covers in their chute and trip-mechanism operated by the receptacle support for releasing the receptacles and covers intermittently.

14. In a machine of the class described, a longitudinally slotted bar, a reciprocatory receptacle-support engaging said bar, means for supplying receptacles to said support, a chute for supplying covers, a cover support attached to said chute in alinement with said receptacle-support, means for operating the receptacle-support, and means for applying covers to the receptacles.

15. In a machine of the class described, a longitudinally reciprocatory receptacle-support, means for supplying receptacles to the support, said means comprising a chute, a shaft crossing said chute and provided with fixed bars of different lengths projecting from opposite sides thereof, and connections between the receptacle-support and said shaft for operating the shaft to intermittently arrest and release receptacles in said chute in their approach to said support.

16. In a machine of the class described, a receptacle-support having cylindrical ends provided with longitudinally extending resilient members adapted to extend between the body of the receptacle and the flange of the cover, and radially expansible and contractible members for engaging the outside of the flange of the cover.

17. In a machine of the class described, a longitudinally movable receptacle support, means for supplying receptacles to said support, a chute for supplying covers, a movable cover-support connected to one side of said chute and operated by the receptacle-support to automatically release covers.

18. In a machine of the class described, a longitudinally movable receptacle-support, means for supplying receptacles, a chute for supplying covers, a cover-support approximately U-shaped connected to said chute, a movable cover releasing device operated by the receptacle support, and means for restoring the support and the releasing device to their normal positions.

19. In a machine of the class described, a longitudinally reciprocatory receptacle-support, means for supplying receptacles, means for intermittently arresting and releasing receptacles, a cover-support in longitudinal alinement with the receptacle-support, means for intermittently arresting and releasing covers, and means for applying covers to receptacles, said reciprocatory receptacle-support being adapted to operate the receptacle arresting and releasing device and the cover arresting and releasing device.

In testimony whereof I affix my signature, in presence of two witnesses.

JOSEPH T. BOND.

Witnesses:
D. C. REINOHL,
PHILIP F. LARNER.